(12) United States Patent
Glaser et al.

(10) Patent No.: US 8,369,795 B2
(45) Date of Patent: Feb. 5, 2013

(54) GAME CONSOLE NOTIFICATION SYSTEM

(75) Inventors: Richard E. Glaser, Woodinville, WA (US); Amy Lynn Landers, Seattle, WA (US); Kevin L. Furr, Bellevue, WA (US); Leonardo G. Del Castillo, Carnation, WA (US); Richard S. Lum, Redmond, WA (US); Steven R. Gunn, Bellevue, WA (US); Wei Guo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 2129 days.

(21) Appl. No.: 11/034,641

(22) Filed: Jan. 12, 2005

(65) Prior Publication Data
US 2006/0154725 A1 Jul. 13, 2006

(51) Int. Cl.
*H04B 1/38* (2006.01)

(52) U.S. Cl. .......................................... 455/73; 375/346

(58) Field of Classification Search ................... 463/37; 455/73; 273/148 B
See application file for complete search history.

(56) References Cited

U.S. PATENT DOCUMENTS

| | | | |
|---|---|---|---|
| 5,759,100 A * | 6/1998 | Nakanishi ....................... 463/37 |
| 6,028,853 A | 2/2000 | Haartsen |
| 6,088,516 A | 7/2000 | Kreisel et al. |
| 6,127,961 A | 10/2000 | Stacy et al. |
| 6,213,879 B1 | 4/2001 | Niizuma et al. |
| 6,213,880 B1 | 4/2001 | Sim |
| 6,241,612 B1 | 6/2001 | Heredia |
| 6,304,250 B1 * | 10/2001 | Yang et al. ..................... 345/168 |
| 6,324,603 B1 | 11/2001 | Niizuma et al. |
| 6,402,616 B1 | 6/2002 | Ogata et al. |
| 6,468,160 B2 | 10/2002 | Eliott |
| 6,529,119 B1 | 3/2003 | Kumar et al. |
| 6,544,124 B2 * | 4/2003 | Ireland et al. .................. 463/37 |
| 6,683,886 B1 | 1/2004 | van der Tujin et al. |
| 6,684,062 B1 * | 1/2004 | Gosior et al. ................... 455/73 |
| 6,712,704 B2 | 3/2004 | Eliott |
| 6,769,989 B2 | 8/2004 | Smith et al. |

(Continued)

FOREIGN PATENT DOCUMENTS

| | | |
|---|---|---|
| CN | 1178478 A | 4/1998 |
| CN | 1466478 A | 1/2004 |

(Continued)

OTHER PUBLICATIONS

Dideles, "Bluetooth: A Technical Overview", XRDS Crossroads: the ACM Magazine for Students, Jun. 2003, 9(4), 16 pages.

(Continued)

*Primary Examiner* — Masud Ahmed
(74) *Attorney, Agent, or Firm* — Woodcock Washburn LLP

(57) ABSTRACT

Systems and methods for providing notifications to players of a gaming console of messages and system notifications. A controller and the gaming console include a four quadrant LED indicator. Each quadrant of the ring may be illuminated individually or together using an LED to indicate the messages and notifications. The quadrants may be illuminated in one of three colors and/or in patterns to indicate different types of notifications. Onscreen displays may be used to supplement the LED indicators to convey information to users. A method of binding and discovering a controller is also provided where the controller may be bound to a gaming console. After a controller is bound to a console, the controller may be discovered by the gaming console where it is assigned a virtual port and enabled for game play.

17 Claims, 6 Drawing Sheets

U.S. PATENT DOCUMENTS

| | | |
|---|---|---|
| 6,872,139 B2 | 3/2005 | Sato et al. |
| 6,878,066 B2 | 4/2005 | Leifer et al. |
| 6,939,232 B2 | 9/2005 | Tanaka et al. |
| 7,175,529 B2 | 2/2007 | Hartman et al. |
| 7,181,370 B2 | 2/2007 | Furem et al. |
| 7,254,159 B1 | 8/2007 | Lavelle et al. |
| 7,290,072 B2 | 10/2007 | Quraishi et al. |
| 2002/0065065 A1 | 5/2002 | Lunsford et al. |
| 2002/0072410 A1 | 6/2002 | Tanaka et al. |
| 2002/0159434 A1 | 10/2002 | Gosior et al. |
| 2003/0050009 A1 | 3/2003 | Kurisko et al. |
| 2003/0104865 A1 | 6/2003 | Itkis et al. |
| 2003/0206157 A1 | 11/2003 | Emerson |
| 2003/0216178 A1 | 11/2003 | Danieli et al. |
| 2004/0009815 A1 | 1/2004 | Zotto et al. |
| 2004/0023721 A1 | 2/2004 | Giobbi |
| 2004/0110563 A1 | 6/2004 | Tanaka et al. |
| 2004/0162137 A1 | 8/2004 | Eliott |
| 2004/0224768 A1* | 11/2004 | Hussaini et al. ............... 463/37 |
| 2004/0235566 A1* | 11/2004 | Hussaini et al. ............... 463/37 |
| 2005/0096086 A1 | 5/2005 | Singamsetty |
| 2005/0169252 A1 | 8/2005 | Riggs |
| 2005/0206618 A1 | 9/2005 | Lee et al. |
| 2005/0215321 A1* | 9/2005 | Hussaini et al. ............... 463/37 |
| 2005/0221895 A1* | 10/2005 | Lum et al. ..................... 463/39 |
| 2005/0245316 A1 | 11/2005 | Tanaka et al. |
| 2005/0260996 A1 | 11/2005 | Groenendaal |
| 2006/0084504 A1 | 4/2006 | Chan et al. |
| 2006/0111180 A1* | 5/2006 | Cheng .......................... 463/36 |
| 2006/0154725 A1 | 7/2006 | Glaser et al. |
| 2006/0195522 A1 | 8/2006 | Miyazaki |
| 2006/0262759 A1 | 11/2006 | Bahl et al. |

FOREIGN PATENT DOCUMENTS

| | | | |
|---|---|---|---|
| EP | 1475131 A1 | 11/2004 | |
| EP | 1475688 A2 | 11/2004 | |
| EP | 1475690 A2 | 11/2004 | |
| EP | 1583317 A1 | 10/2005 | |
| EP | 1583321 A1 | 10/2005 | |
| EP | 1681658 A2 | 7/2006 | |
| GB | 2374491 A | 10/2002 | |
| JP | 5-56191 A | 3/1993 | |
| JP | 8-309031 A | 11/1996 | |
| JP | 8-331201 A | 12/1996 | |
| JP | 2001-501432 A | 1/2001 | |
| JP | 2002-140154 A | 5/2002 | |
| JP | 2002-202836 A | 7/2002 | |
| JP | 2002-202843 A | 7/2002 | |
| JP | 2002-223266 A | 8/2002 | |
| JP | 2002-224449 A | 8/2002 | |
| JP | 2002-281048 A | 9/2002 | |
| JP | 2003-23391 A | 1/2003 | |
| JP | 2003-210865 A | 7/2003 | |
| JP | 2004-005507 A | 1/2004 | |
| JP | 2004-329915 A | 11/2004 | |
| JP | 2005-217646 A | 8/2005 | |
| JP | 2005-288161 A | 10/2005 | |
| JP | 2005-288180 A | 10/2005 | |
| KR | 10-2005-0078226 | 8/2005 | |
| WO | WO 92/08195 A1 | 5/1992 | |
| WO | WO 99/07113 A2 | 2/1999 | |
| WO | WO 01/66209 A1 | 9/2001 | |
| WO | WO 02/36226 A1 | 5/2002 | |
| WO | WO 03/071706 A1 | 8/2003 | |
| WO | WO 2005/008966 A1 | 1/2005 | |

OTHER PUBLICATIONS

EP Application No. 05112391 : Extended European Search Report dated May 25, 2010, 5 pages.

EP Application No. 06826258: Extended European Search Report, Sep. 15, 2010, 8 pages.

European Application No. 06836859.6: Extended European Search Report, Sep. 13, 2011, 10 pages.

Teamxbox, "Logitech Cordless Headset Review (Xbox)", http:-hardware.teambox.com-reviews-xbox-23.Logitech-Cordless-Headset-p1-, accessed Aug. 19, 2010, 1-3.

* cited by examiner

162

GAME CONSOLE NOTIFICATION SYSTEM

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2004, Microsoft Corporation, All Rights Reserved.

FIELD OF THE INVENTION

This invention generally relates to the field of gaming and multimedia devices. In particular, the present invention is directed to a system and method of providing notifications at a console or controller.

BACKGROUND OF THE INVENTION

Wireless controllers provide players with freedom of movement by wirelessly connecting the controller to the gaming console. Typically, the controllers provide features such as vibration feedback, mini joysticks, D-pad, pressure-sensitive buttons, etc. that players would find on wired controllers. In addition, the systems that connect wireless controllers to gaming consoles often allow multiple players to play at once on the console.

Conventional controllers and gaming consoles, however, fail to provide a system and method of providing notifications to players. For example, it is difficult for players to know if their wireless controller has connected to the console as no indication is provided of a successful connection. It is also difficult for users of wireless controllers to know what player number or port number they are connected to, i.e. the prior art has not embodied a virtual analog to the cable being plugged into a physical port. This problem also exists where there may be a mixture of wired and wireless controllers which must be mapped to virtual ports.

Also, messages need to be conveyed to a player. Conventional wireless controllers cannot notify the player of such messages, nor identify the appropriate player of a message. Thus, conventional consoles and controllers have failed to provide a method for conveying notifications to players about events that may be of interest. The present invention provides such a solution.

SUMMARY OF THE INVENTION

The present invention is direct to a systems and methods for providing notifications to players of a gaming console of messages and system notifications. Also provided are systems and methods of associating a controller to a console. The controller and the gaming console may each include a four quadrant LED indicator, where each quadrant of the ring may be illuminated using an LED to indicate the messages and notifications. The quadrants may be illuminated in one of three colors and in patterns to indicate different types of notifications. Onscreen displays may be used to supplement the LED indicators to convey information to users.

The present invention also is directed to a method of binding and discovering a controller. The controller may be bound to a gaming console by pressing a bind button on the controller and gaming console. After a controller is bound to a console, the controller may be discovered by the gaming console where it is assigned a virtual port and enabled for game play.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
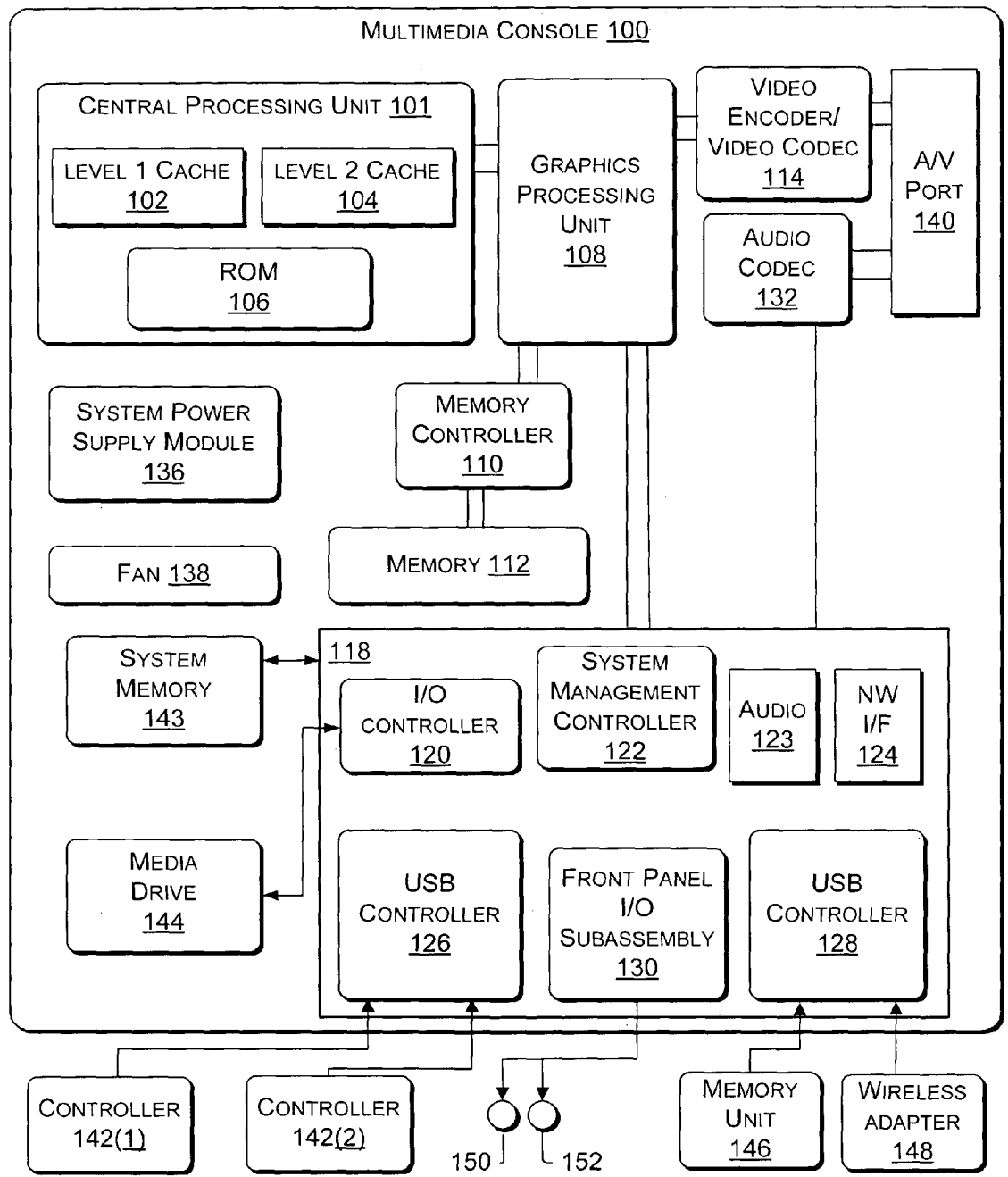
FIG. 1 is a block diagram showing a gaming console in which aspects of the present invention may be implemented.

FIG. 1 illustrates the functional components of a multimedia/gaming console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

The present invention is directed to a solution for conveying virtual controller ports (e.g., wireless controllers) as distinct from the two physical controllers 142(1) and 142(2). The present invention also addresses the need to inform players of messages and system notifications. To accomplish these goals and others, a wireless controller is provided that includes an LED indicator having quadrants that indicate a particular wireless controller, and a notification system that interacts with games running on the console 100.

Figure 2:
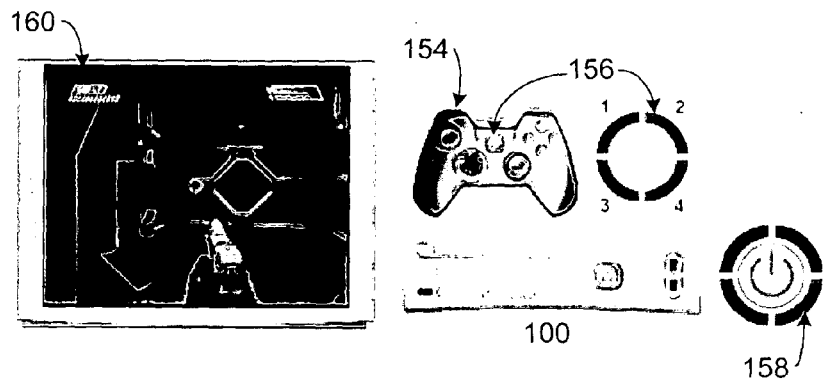
FIG. 2 illustrates a controller and LED indicators.

Referring to FIG. 2, there is illustrated an exemplary wireless controller 154 having a four quadrant LED indicator 156 (and enlarged view) and console 100 having a four quadrant indicator 158. The controller 154 also includes vibration feedback, mini-joysticks, pressure-sensitive buttons, etc. A game is shown on the screen 160. The console indicator 158 is shown surrounding a power button, however, other configurations may be implemented. Each quadrant of the ring may be illuminated by an LED, which may be either a single color or bi-colored to illuminate in plural colors. As will be described below, the quadrants may be illuminated in patterns indicating the notifications, system status, binding and discovery.

To support an environment where multiple consoles 100 and wireless controllers 154 may coexist, each controller is logically "bound" to a single console 100 so that a link is established with only that console 100. A controller 154 can not be bound to more than one console 100 at a time. Binding is the process by which a console 100 transmits information to a controller 154 that will enable that controller to establish a link with the console 100. Once "bound" to a console 100, the controller 154 attempts to establish a link with the console 100 to which it is bound whenever the controller 154 is turned on.

It is preferable that binding information is retained only in the controller. Binding is one to one with respect to the controller 154, but it is one to many with respect to the console 100. Binding, thus, persists on the controller 154 across battery discharge/charge cycles, until a new binding relationship is established. Establishing a binding relationship is attempted when a BIND button on the console and a BIND button on a wireless controller 154 are pressed within a predetermined period of time of each other. Successfully establishing a binding relationship is dependent on successfully establishing a radio communication link and executing a mutual verification algorithm.

The console is preferably powered up before pressing its BIND button. If a user initiates binding on a controller 154 that is currently connected to a console 100, the controller 154 drops the connection to the console 100 prior to attempting the binding process. As the binding process operates, a status notification screen may display binding and discovery process (e.g., binding . . . bound . . . discovered). Binding is a one to one event. In other words, pressing the binding button on the console 100 will bind one controller 154 at a time. To bind a second controller 154, the BIND button on the console 100 is pressed a second time. If binding is not successful within a predetermined time, the console 100 or controller 154 will automatically time out and return to a previous state such that the previous binding relationship is not lost.

There are four virtual controller ports on the console 100, referred to herein as "Vports." The Vports represent the active game controllers connected to the console 100, either wired or wirelessly. The numbered Vports are automatically assigned to controllers in the order they are connected to the console 100. Each Vport is represented by a quadrant of the LED indicator 156 and the console indicator 158. "Discovery" is the process during which a wired or wireless game device is recognized by the console 100, assigned a Vport, and made available for game play.

Thus, the acts of "binding" and "discovery" are preferably two different acts. The act of binding is initiated by pressing the BIND buttons on the controller and console. Once bound, the controller will begin the discovery process, and if successful, will be assigned the first available Vport, which in this case is Vport 1 as described. If one to three controllers had previously been bound and discovered, then the next controller discovered would be assigned Vport 2, 3, or 4 respectively. If, four controllers were already discovered, then the binding process could still be performed, however no Vport would be available to assign, so the controller would not be assigned a Vport, however it would still be bound to the console and available to be discovered if one of the other four controllers were either turned off or bound to a new console.

Figure 3:
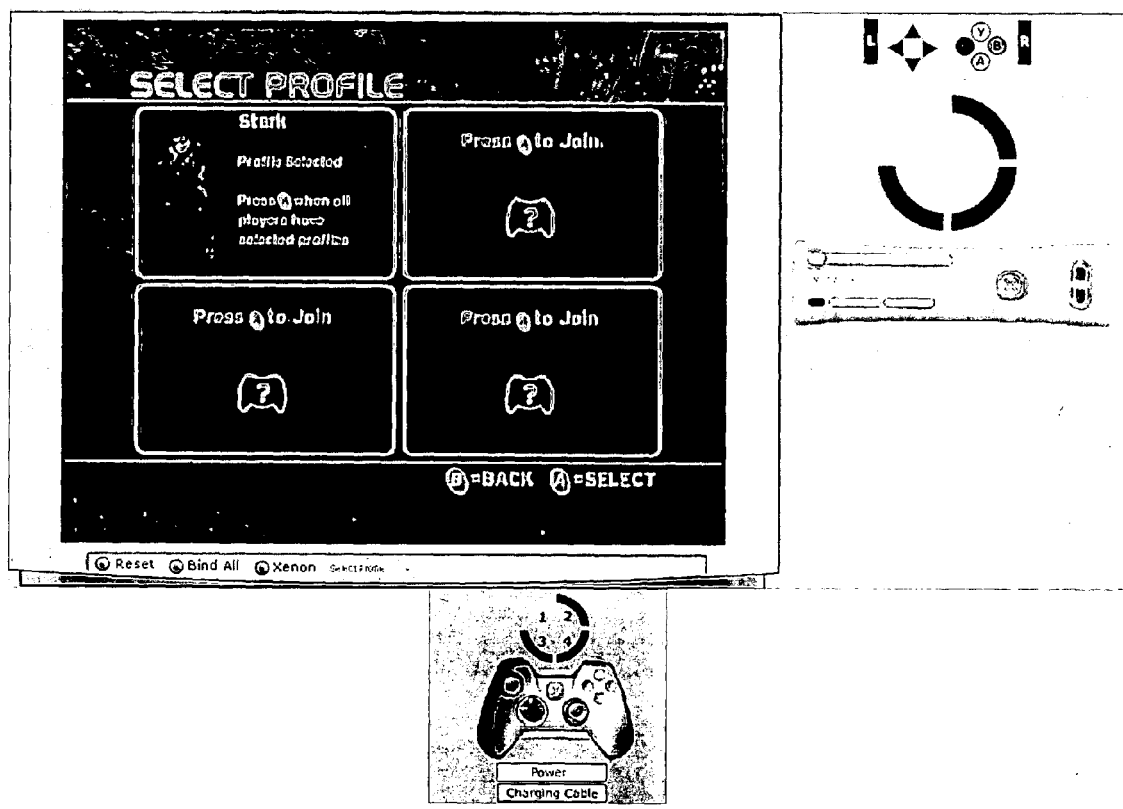
FIGS. 3 and 4 illustrate one or more controllers being bound and discovered by the console.
Figure 4:
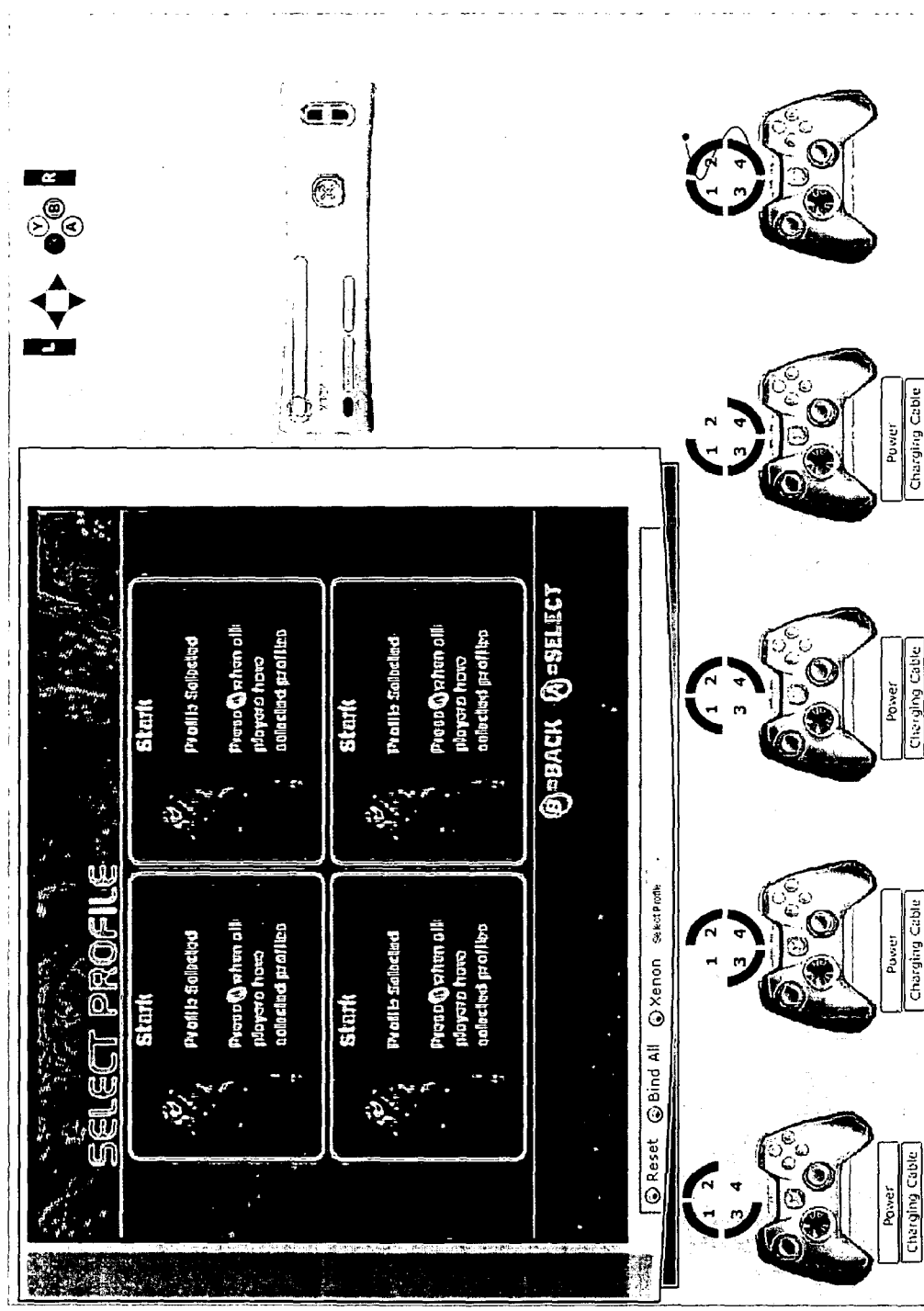

Referring to FIGS. 3 and 4, there is a visualization of the binding and discovery processes and how the LED indicator 156 and the console indicator 158 visually convey the processes to players. As shown in FIG. 3, the controller has been powered on and the BIND button on the console 100 and the controller have been pressed. After the binding process has completed, the discovery process takes place. Because this is the first controller to be discovered by the console 100, it is associated with Vport 1 and the top left quadrant of the indicators 156 and 158 will illuminate to signal the connection. As shown in FIG. 4, if more than one controller is discovered by the console 100, the other quadrants of indicator 158 are illuminated in succession. Thus, if two controllers are connected, two quadrants of the indicator 158 will illuminate, and so on up to four controllers and four quadrants. It is noted that while additional quadrants are successively illuminated on the console, only a single quadrant is illuminated on any single controller at a time.

The position of the quadrant preferably corresponds to the Vport as follows:
   1, top left quadrant
   2, top right quadrant
   3, lower left quadrant
   4, lower right quadrant In addition, as shown in FIG. 4, where multiple players are playing, the position of the players on the screen correspond to the quadrant assigned to their particular controller.

Vports are preferably assigned in ascending order (1 through 4), according to the following rules:

If the system is powered up by a controller, that controller (wired or wireless) is assigned Vport 1.

Wired controllers plugged into the console are automatically assigned the next available Vport According to the following order:
   Controllers connected via hub to USB Port A.
   Controller directly plugged into USB Port A (e.g., controller 142(1)).
   Controllers connected via hub to USB Port B.
   Controller directly plugged into USB Port B (e.g., controller 142(2)).
   Controllers connected via hub to USB Port C
   Controller directly plugged into USB Port C Vports are vacated as controllers are unplugged or powered off. Logically, a wireless controller that is powered off is treated the same as a wired controller that is unplugged from the console 100. Once powered-up, the console 100 will assign additional wired and wireless controllers to available Vports in the order in which they are connected or powered up. During game play, the game will be notified when a controller is unplugged. In the event that the controller that is unplugged is currently being used in the game, the game will pause and display a disconnect message (see, FIG. 8). The game also notifies the console 100 that the vacated Vport is the next to be repopulated should a controller be reconnected. Should subsequent disconnects occur, the console notifies the game and the game reports back with the next Vport to populate. The console maintains in a Last-In-First-Out stack for the next Vport assignment requested by the game.

Thus, as controllers are reconnected, they are assigned to Vports according to the following rules:

If a Next Vport stack has a value in it, the controller is assigned to the specified Vport and the Vport is popped off the stack.

If the Next Vport stack is empty, the controller is assigned to the lowest numbered vacant Vport.

If no there are no vacant Vports, then the controller is not assigned a Vport. If the controller is wireless, it displays the failure to connect display and is powered down. If the controller is wired, no quadrant is illuminated on the controller.

A battery charging cable may be used to attach a wireless controller 154 to a console 100 in the event that a wireless connection is not possible or when battery power in not available. In this condition, the wireless controller 154 operates like a wired controller and the console 100 provides the power to operate the controller 154. However, if the controller 154 is plugged into a battery charger, not the console 100, it will continue to operate as a wireless controller 154. If the controller 154 is powered off while charging, the controller 154 will release its Vport.

The wireless controller may attempt to maximize battery life through power management. In a low power state, the controller 154 decreases its communication rate with the console 154. The assigned Vport assignment is maintained in this state. However, if the controller 154 is not used for a predetermined period of time after entering the low power state, it releases the Vport and powers off.

The controller 154 may also provide notifications to a player via the LED indicator 156 and LEDs, which can illuminate in a selected color (e.g., green, red and orange). The quadrants can be illuminated in patterns indicating notifications, system status, binding, discovery, and system errors. For example, the LED may indicate that the controller is connected to a console, an alert state, and messages. Further, onscreen notifications may be presented in conjunction with the LED signals. Exemplary onscreen notifications may include game invitations, low battery warnings, system errors, etc.

Figure 5:
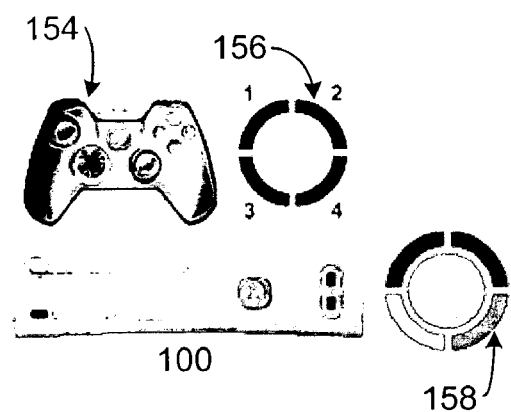
FIGS. 5-12 illustrate exemplary notifications and onscreen displays that are conveyed to players.
Figure 6:
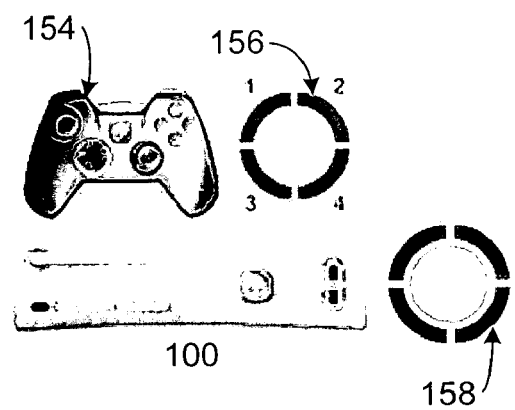
Figure 7:
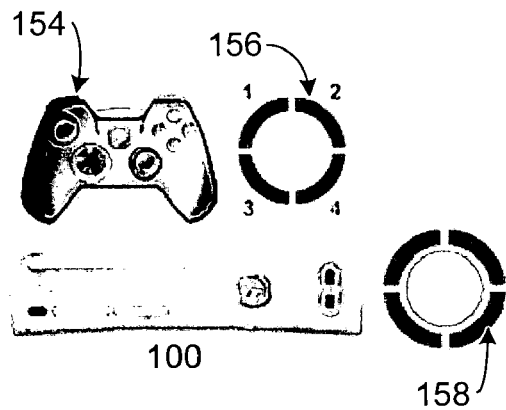

An exemplary set of notifications and warnings are shown in FIG. 2. To convey the notifications and warnings, the LEDs preferably operate in three basic patterns: cycle, flash and on. For example, in FIG. 5, the indicator 158 may illuminate the LEDs such that they cycle to indicate that the BIND button on the console 100 has been pressed. Similarly, in FIG. 6, the indicator 156 may illuminate the LEDs such that they cycle to indicate that the BIND button on the controller 154 has been pressed. FIG. 7 shows that all LEDs may be flashed on both the indicators 156 and 158 to show discovery of the controller 154.

Figure 8:
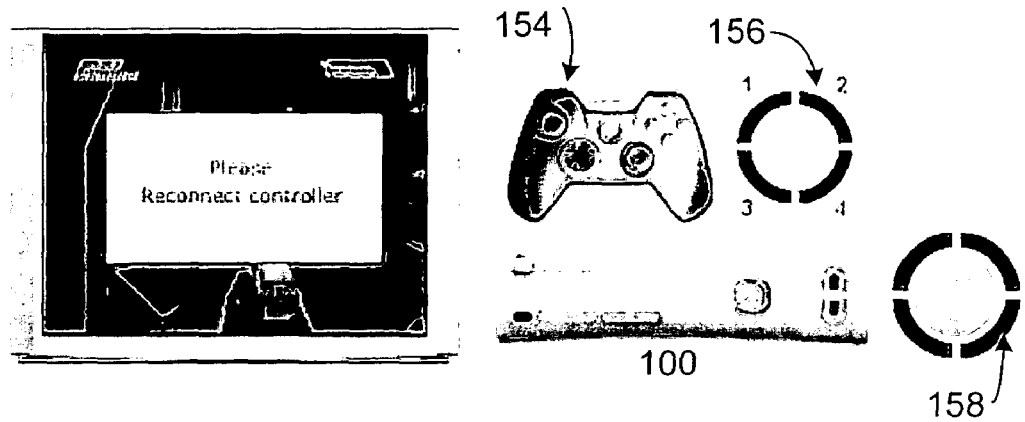

As noted above, messages and warnings may be presented in a UI. FIG. 8 shows a warning that a controller has been disconnected from the console 100 and it should be reconnected. A basic controller status screen may also be presented the displays the signal strength and percentage of battery power of a wireless controller and also provides access to a manual Sleep button.

Figure 9:
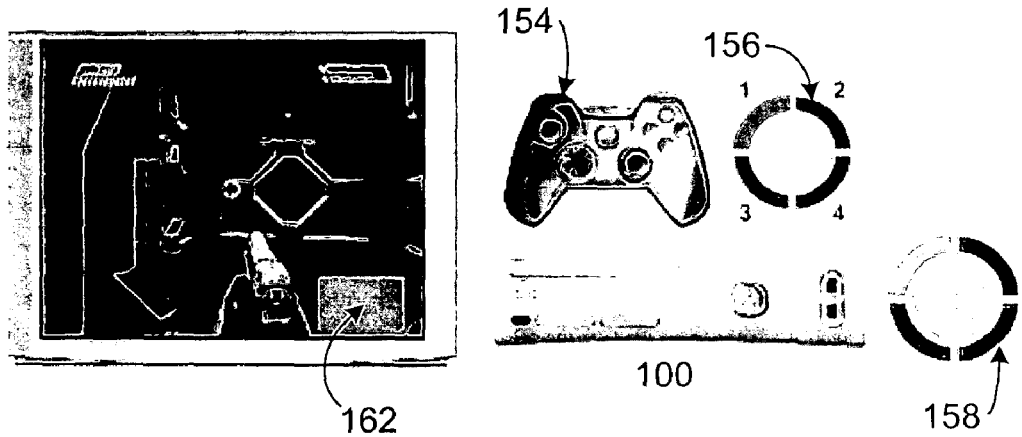
Figure 10:
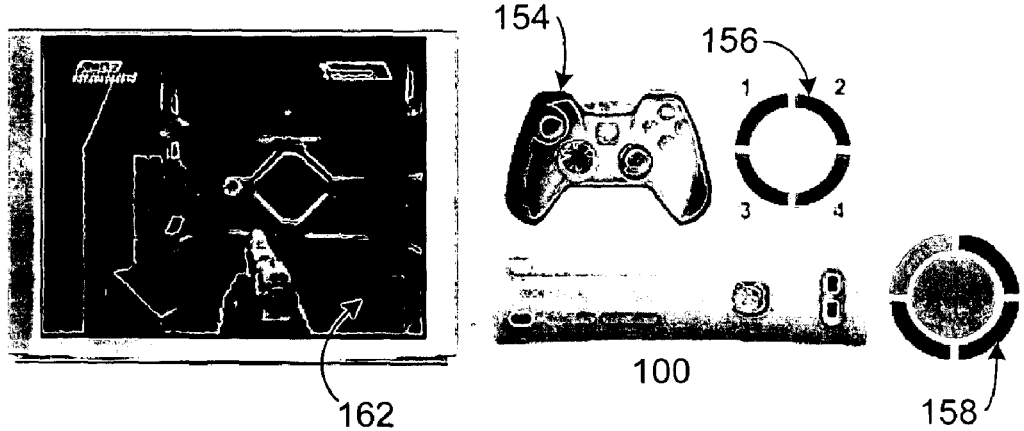
Figure 11:
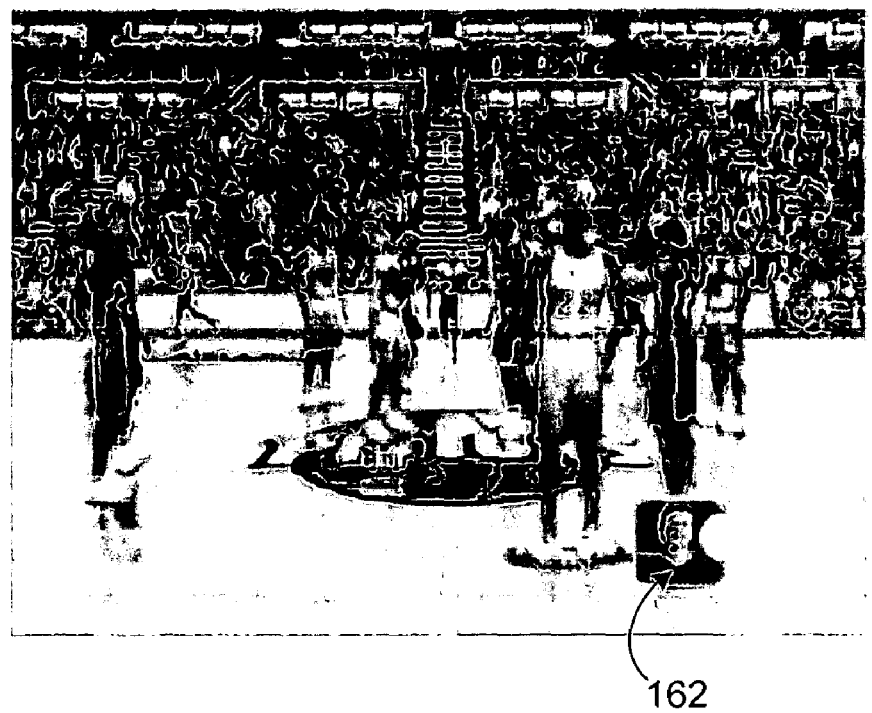
Figure 12:
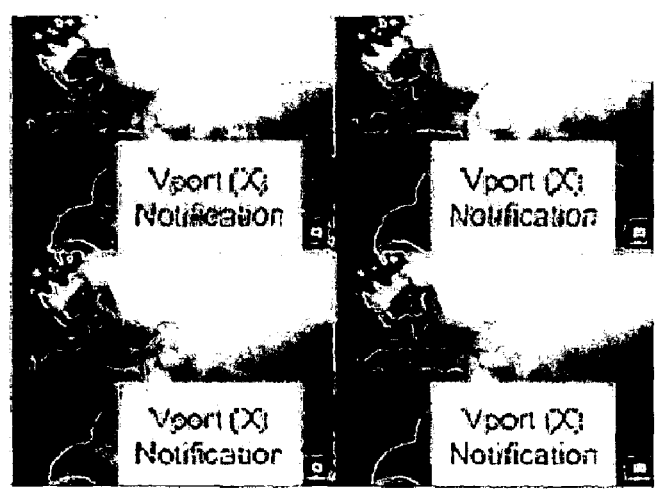

Referring to FIGS. 9-10, a notification may be provided via a small onscreen panel 162 which notifies the player that they have a message, system message or system problem (e.g., low battery, wireless signal loss). The condition may be indicated on the indicators 156 and 158 by illuminating the quadrant to which the controller 154 is bound and to which the message is intended. FIG. 11 illustrates a message in the panel 162 conveying that another player would like to chat. FIG. 12 illustrates onscreen messaging when multiple players and playing with controllers bound to the console.

Those of ordinary skill in the art will now understand that any message or notification may be conveyed to the user via the LED indicators and onscreen notifications. The messages or notifications may be presented via numerous combinations of colors, lighting patterns and UI messages and the examples provided herein are neither exhaustive nor limiting of the present invention. In addition, notifications could also be indicated using an audible sound or vibration in the controller.

In accordance with a feature of the invention, the console 100 may be operated either in a horizontal or vertical orientation. A gravity-sensing switch is used in the console 100 to detect the orientation and adjusts the display presentation such that the spatial relationship between Vport number and the display are maintained as indicated above.

The LED notification system of the present invention is designed to provide users with a simple, consistent way in which to add and remove controllers from the console, while conveying port assignments, messages, notifications and system errors. While the present invention has been described in connection with the preferred embodiments of the various Figs., it is to be understood that other similar embodiments may be used or modifications and additions may be made to the described embodiment for performing the same function of the present invention without deviating therefrom.

What is claimed:

1. A gaming controller, comprising:
   a plurality of buttons; and
   a plurality of visual indicators, each of which corresponds to a different one of a plurality of ports of an associated gaming console;
   wherein one of the plurality of visual indicators is illuminated to notify a user which one of the corresponding plurality of ports of the associated gaming console has been assigned to the gaming controller.

2. The gaming controller of claim 1, wherein each of said visual indicators has a corresponding indicator on said associated gaming console.

3. The gaming controller of claim 2, further comprising a bind button, wherein when said bind button is pressed, said gaming controller will bind with said associated gaming console, and wherein said visual indicator is illuminated to indicate that said gaming controller is bound to said associated gaming console.

4. The gaming controller of claim 3, wherein said visual indicators are arranged as quadrants, and one of said quadrants is associated with said gaming controller so long as said gaming controller is bound to said associated gaming console via a discovery process.

5. The gaming controller of claim 1, further comprising at least one of an audible component and a vibration controller, wherein messages are conveyed by said at least one of said audible component and said vibration controller.

6. The gaming controller of claim 1, wherein a predetermined sequence of illuminating said LED is utilized to convey messages to the user.

7. A method of associating a gaming controller to a gaming console, comprising at the gaming controller:
   establishing a connection with said gaming console, wherein the gaming controller is assigned to one of a plurality of ports of the gaming console;
   illuminating one of a plurality of visual indicators on the gaming controller, each visual indicator corresponding to a respective one of a plurality of different ports on the gaming console, the illuminated visual indicator indicating on the gaming controller which port of the plurality of ports of the gaming console has been assigned to the gaming controller; and
   making said gaming controller available for game play.

8. The method of claim 7, wherein said establishing a connection comprises a bind sequence comprising:
   initiating said bind sequence via a first action at said gaming controller;
   initiating a second action at said gaming console within a predetermined period of time of said first action, whereby said gaming controller is recognized by said gaming console; and
   storing, in said gaming controller, binding information.

9. The method of claim 7, further comprising:
   requesting a port assignment from said gaming controller.

10. The method of claim 9, further comprising at the gaming console:
    determining a number of assigned ports; and
    assigning a next available port to said gaming controller.

11. The method of claim 10, further comprising at the gaming console:
    determining if a last available port has already been assigned; and
    if so, maintaining said binding information in said gaming controller and assigning a previously used port as said next available port to said gaming controller when said previously used port is released by a second gaming controller.

12. The method of claim 9, further comprising providing an indication that said controller has been discovered by said gaming console.

13. The method of claim 12, wherein said indication is provided by a plurality of LEDs on said gaming controller.

14. The method of claim 13, wherein said plurality of LEDs comprises four quadrants, each of said quadrants representing a different one of said plurality of ports to which the gaming controller may be assigned, said method further comprising illuminating one of said quadrants to indicate which of said plurality of ports has been assigned to the gaming controller.

15. The method of claim 14, further comprising providing notifications via said one of said quadrants to a player using said gaming controller.

16. The method of claim 9, wherein said controller is either a wired controller or a wireless controller.

17. The method of claim 7, wherein each of said plurality of ports is a virtual port.

* * * * *